(12) United States Patent
Takamori et al.

(10) Patent No.: US 11,987,933 B2
(45) Date of Patent: May 21, 2024

(54) PAPERMAKING DEVICE AND METHOD FOR PRODUCING PAPERMAKING DEVICE

(71) Applicant: ICHIKAWA CO., LTD., Tokyo (JP)

(72) Inventors: Yuya Takamori, Tokyo (JP); Manami Morinaga, Tokyo (JP)

(73) Assignee: ICHIKAWA CO., LTD., Tokyo (JP)

(*) Notice: Subject to any disclaimer, the term of this patent is extended or adjusted under 35 U.S.C. 154(b) by 0 days.

(21) Appl. No.: 17/815,431

(22) Filed: Jul. 27, 2022

(65) Prior Publication Data
US 2023/0051917 A1 Feb. 16, 2023

(30) Foreign Application Priority Data

Jul. 30, 2021 (JP) .............................. 2021-126322

(51) Int. Cl.
*D21F 3/02* (2006.01)
*C08G 18/10* (2006.01)
*C08G 18/32* (2006.01)
*D21F 7/08* (2006.01)

(52) U.S. Cl.
CPC ....... *D21F 3/0236* (2013.01); *C08G 18/3221* (2013.01); *D21F 7/083* (2013.01); *C08G 18/10* (2013.01)

(58) Field of Classification Search
CPC ...... D21F 3/0236; D21F 7/083; D21F 3/0227; C08G 18/3221; C08G 18/10; C08G 18/724; C08G 18/757; C08G 18/7671; C08G 18/44; C08G 18/12; C08G 18/7621; C08G 18/7685
See application file for complete search history.

(56) References Cited

U.S. PATENT DOCUMENTS

2020/0165777 A1* 5/2020 Delmas ................. D21F 3/0227

FOREIGN PATENT DOCUMENTS

| JP | 3201639 U | 12/2015 |
|---|---|---|
| JP | 2016-199813 A | 12/2016 |
| JP | 2020-526681 A | 8/2020 |
| WO | WO 2014/086650 | 6/2014 |

OTHER PUBLICATIONS

Third Party Observation filed in EP application No. 22187536.2 dated Dec. 7, 2023, w/Machine Translation; References 15 and 24-25, cited therein.
PEPCD (Cas No. 92538-66-4) 2020(Mitsubishi Chemical), 8 pages.
Michael Szycher, Ph.D.; Szycher's Handbook of Polyurethanes, Second Edition Jul. 13, 2012, 4pp.

* cited by examiner

*Primary Examiner* — Eric Hug
*Assistant Examiner* — Matthew M Eslami
(74) *Attorney, Agent, or Firm* — Oblon, McClelland, Maier & Neustadt, L.L.P.

(57) ABSTRACT

A papermaking device may have excellent strength and suppressed unevenness in strength between its parts. Such a papermaking device may be used in papermaking machine and may include at least one resin layer comprising polyurethane resin. The polyurethane resin may be obtained by reacting a urethane prepolymer having an isocyanate group with a curing agent having an active hydrogen group. The urethane prepolymer may be obtained by reacting a polyisocyanate compound including 2,4-tolylene-diisocyanate and/or 2,6-tolylene-diisocyanate with a polyol compound including one or more polyether polycarbonate diol(s).

19 Claims, 5 Drawing Sheets

PAPERMAKING DEVICE AND METHOD FOR PRODUCING PAPERMAKING DEVICE

CROSS REFERENCE TO RELATED APPLICATIONS

This application is based upon and claims benefit of priority from Japanese Patent Application No. 2021-126322 filed on Jul. 30, 2021, the entire contents of which are incorporated herein by reference.

BACKGROUND

Technical Field

The present invention relates to a papermaking device and a method for producing a papermaking device.

Background Art

A papermaking machine that removes water from a raw paper material is generally provided with a wire part, a press part and a dryer part. These wire part, press part and dryer part are arranged in this order along the wet paper web transfer direction.

The wet paper web is transferred from the wire part to the press part and then to the dryer part, by being passed successively from one papermaking device to another equipped in each of these parts while being dehydrated, and finally dried in the dryer part. The papermaking devices used in these parts correspond to each function of these part such as dehydrating (wire part), squeezing (press part), and drying (dryer part).

For instance, in each part of such a papermaking machine, various papermaking belts and papermaking rolls are used as papermaking devices for purposes such as transferring wet paper web or compressing wet paper web, etc. Such papermaking belts include, for example, a wet paper web transfer belt for transferring and delivering wet paper web (a transfer belt), a shoe press belt used in a shoe press mechanism, etc., whereas papermaking rolls include, for example, a press roll used in a roll press mechanism, etc.

Specifically, a press part generally is provided with one or more press device(s) which is/are positioned in series along the wet paper web transfer direction. In each press device, either an endless felt is placed, or ended felts are connected on the papermaking machine to form an endless felt which is placed in the press device. And, each press device has a roll press mechanism consisting of a pair of rolls opposing to each other, or a shoe press mechanism having an endless shoe press belt placed between a concave-shaped shoe opposing to a roll.

A felt carrying a wet paper web moves along the wet paper web transfer direction, passing through either the roll press mechanism or the shoe press mechanism, where the water is squeezed out of the wet paper web by pressing the felt carrying the wet paper web such that the felt continuously absorbs water or the water passes through the felt to be drained to the outside.

In a shoe press belt, in general, a reinforcing substrate is embedded in a resin, and this resin constitutes an outer circumferential layer which is in contact with a felt and an inner circumferential layer which is in contact with a shoe. The shoe press belt repeatedly runs between the roll and the shoe being pressurized. On the surface of the press roll a resin layer is disposed, and this resin layer repeatedly presses the wet paper web in the roll press mechanism in cooperation with the felt and the opposing press roll. Because a papermaking machine is generally run at a high speed, these papermaking device needs a good durability including abrasion resistance and flex resistance.

JP 2016-199813 A proposes, in a shoe press belt having drain grooves, for a purpose of preventing the collapse or loss of a land that constitutes the drain grooves and further preventing or reducing the occurrence of cracks, a shoe press belt comprising a reinforcing substrate embedded in polyurethane wherein the polyurethane and the reinforcing substrate are integrated, wherein at least the polyurethane constituting the outer circumferential surface of the shoe press belt is a thermosetting polyurethane obtained by curing a urethane prepolymer with a curing agent, and the urethane prepolymer comprises a first urethane prepolymer obtained by a reaction of a polyol component comprising certain straight-chain aliphatic polycarbonate diol with an aromatic diisocyanate.

SUMMARY

Technical Problem

A shoe press belt that is provided with a polyurethane layer comprising a polycarbonate diol as a component of a urethane prepolymer has an excellent strength. On the other hand, the present inventors found that, when a polycarbonate diol is used as a component of a urethane prepolymer, there is unevenness in strength among parts of the obtained shoe press belt. The presence of uneven strength among parts of the shoe press belt may cause the shoe press belt to be damaged or degraded starting from a part where the strength is low, and, as a result, it will be difficult to increase the durability of the shoe press belt. This also applies to other papermaking devices having resin layers such as a wet paper web transfer belt and a press roll.

Accordingly, an object of the present invention is to provide a papermaking device having an excellent strength in which the unevenness in strength between its parts is suppressed, and a method for producing such papermaking device.

Solution to Problem

The present inventors have made intensive studies in order to achieve the aforementioned object, and as a result found that it is possible to increase the strength of the resin layer that constitutes the shoe press belt while suppressing the unevenness in strength by employing a polyurethane resin obtainable by using a prepolymer obtainable by reacting a polyisocyanate compound comprising 2,4-tolylene-diisocyanate and/or 2,6-tolylene-diisocyanate with a polyol compound comprising one or more polyether polycarbonate diol(s) in the resin layer of the papermaking device, and thus accomplished the present invention.

A gist of the present invention is as follows:

[1] A papermaking device for use in a papermaking machine, comprising at least one resin layer comprising a polyurethane resin, wherein:
the polyurethane resin is obtainable by reacting a urethane prepolymer having an isocyanate group with a curing agent having an active hydrogen group, wherein:
the urethane prepolymer is obtainable by reacting a polyisocyanate compound comprising 2,4-tolylene-diisocyanate and/or 2,6-tolylene-diisocyanate with a polyol compound comprising one or more polyether polycarbonate

[2] The papermaking device according to [1], wherein the total amount of 2,4-tolylene-diisocyanate and/or 2,6-tolylene-diisocyanate contained in the polyisocyanate compound is equal to or higher than 50% by mass.
[3] The papermaking device according to [1] or [2], wherein the polyisocyanate compound further comprises one or more selected from the group consisting of 4,4'-methylenebis (phenylisocyanate), dimethylbiphenylene diisocyanate, 1,3-bis(isocyanatemethyl)cyclohexane and 1,4-bis(isocyanate-methyl)cyclohexane.
[4] The papermaking device according to any one of [1] to [3], wherein the amount of one or more polyether polycarbonate diol(s) contained in the polyol compound is equal to or higher than 50% by mass.
[5] The papermaking device according to any one of [1] to [4], wherein the curing agent comprises a polyamine.
[6] The papermaking device according to any one of [1] to [5], wherein the urethane prepolymer comprises as (a) component(s) an aliphatic polyol and/or aliphatic polyisocyanate.
[7] The papermaking device according to [6], wherein the aliphatic polyol comprises a straight-chain alkylene glycol.
[8] The papermaking device according to [6] or [7], wherein the aliphatic polyisocyanate comprises 1,3-bis(isocyanate-methyl)cyclohexane and/or 1,4-bis(isocyanatemethyl)cyclo-hexane.
[9] The papermaking device according to any one of [1] to [8], wherein the total amount of the unreacted 2,4-tolylene-diisocyanate and 2,6-tolylene-diisocyanate contained in the prepolymer is equal to or less than 1.0% by mass in the urethane prepolymer.
[10] The papermaking device according to any one of [1] to [9], wherein the papermaking device is a shoe press belt.
[11] The papermaking device according to [10],
comprising as the resin layer a first layer which constitutes the outer circumferential surface of the shoe press belt, wherein:
the first layer comprises the polyurethane resin.
[12] The papermaking device according to [10] or [11]
comprising as the resin layer a second layer which constitutes the inner circumferential surface of the shoe press belt, wherein:
the second layer comprises the polyurethane resin.
[13] A method for producing a papermaking device for use in a papermaking machine,
comprising a step of forming a resin layer comprising a polyurethane resin by curing a polyurethane material, wherein:
the polyurethane material comprises a urethane prepolymer having an isocyanate group and a curing agent having an active hydrogen group, wherein
the urethane prepolymer is obtainable by reacting a polyisocyanate compound comprising 2,4-tolylene-diisocyanate and/or 2,6-tolylene-diisocyanate with a polyol compound comprising one or more polyether polycarbonate diol(s).

Advantageous Effects of Invention

The above-mentioned configuration allows for providing a papermaking device having an excellent strength in which the unevenness in strength between its parts is suppressed, and a method for producing the papermaking device.

DESCRIPTION OF THE EMBODIMENTS

Hereinafter, referring to the appended drawings, preferred embodiments of a papermaking device and a method for producing a papermaking device according to the present invention will be described in detail. In the following description, a shoe press belt will be described as an example of a papermaking device, though it is needless to say that the papermaking device according to the present invention is not limited to the shoe press belt.

<1. Shoe Press Belt>

First, a shoe press belt as an example of a papermaking device according to a preferred embodiment of the present invention will be explained.

Figure 1:
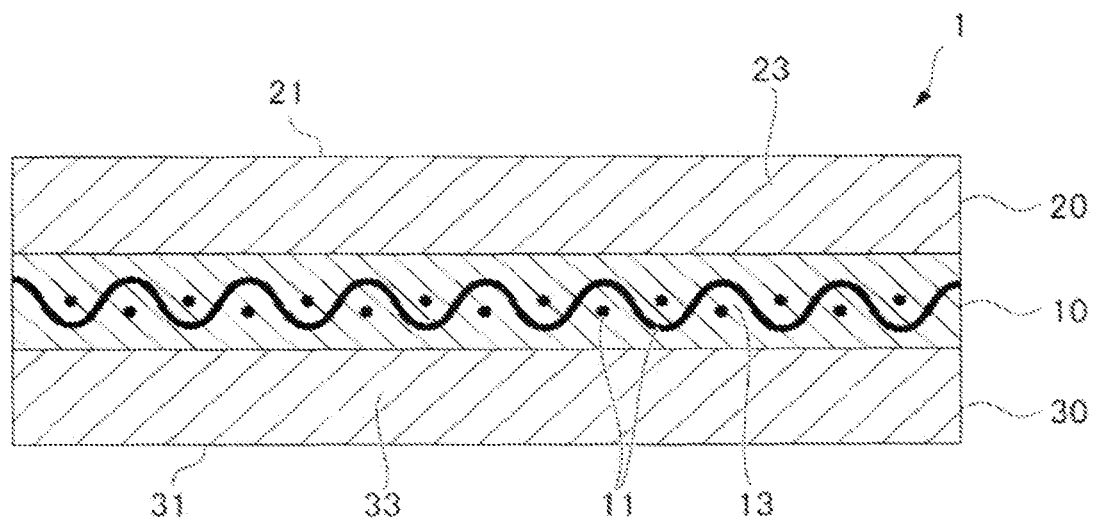
FIG. 1 is a cross-sectional view in a cross machine direction showing a papermaking device according to one embodiment of the present invention.

FIG. 1 is a cross-sectional view in a cross machine direction showing an example of a papermaking device (a shoe press belt) according to a preferred embodiment of the present invention. Note that, in the drawing, each member has been emphasized in size as appropriate for ease of illustration and thus does not indicate the actual proportion and size of each member. Herein, the aforementioned cross machine direction may be referred to as "CMD", and the machine direction may be referred to as "MD".

The shoe press belt 1 shown in FIG. 1 is used, in the press part, more specifically in a shoe press mechanism, of a papermaking machine, to transfer a wet paper web in cooperation with a felt and to squeeze water from the wet paper web. The shoe press belt 1 forms an endless band-shaped body. That is, the shoe press belt 1 is an annular belt. In addition, a circumferential direction of the shoe press belt 1 is generally disposed along a machine direction (MD) of the papermaking machine.

The shoe press belt 1 shown in FIG. 1 has a reinforcing fibrous substrate layer 10, a first resin layer 20 provided on one principal surface on the outer surface side of the reinforcing fibrous substrate layer 10, and a second resin layer 30 provided on the other principal surface on the inner surface of the reinforcing fibrous substrate layer 10, and these layers are laminated to form the shoe press belt 1.

The reinforcing fibrous substrate layer 10 is composed of a reinforcing fibrous substrate 11 and a resin 13. The resin 13 is present in the reinforcing fibrous substrate layer 10 such that it fills the spaces between fibers in the reinforcing fibrous substrate 11. That is, a part of the resin 13 is impregnated into the reinforcing fibrous substrate 11, whereas the reinforcing fibrous substrate 11 is embedded in the resin 13.

The reinforcing fibrous substrate 11 is not particularly limited, and, for example, a woven fabric consisting of warp yarns and weft yarns woven by a weaving machine, etc. may generally be used. An unwoven grid-like web material in which warp rows and weft rows are superimposed on each other can also be used. Alternatively, the woven fabric, grid-like material, etc. are used in combination of two or more.

The fineness of the fibers constituting the reinforcing fibrous substrate 11 is not particularly limited, and can be, for example, equal to or higher than 300 and equal to or less than 10,000 dtex, preferably, equal to or higher than 500 and equal to or less than 6,000 dtex.

The fineness of the fibers constituting the reinforcing fibrous substrate 11 can be different at each part where the fiber is used. For instance, the warp yarns and weft yarns of the reinforcing fibrous substrate 11 may have different fineness.

As ingredients of a reinforcing fibrous substrate 11, polyester (polyethylene terephthalate, polybutylene terephthalate, etc.), aliphatic polyamide (polyamide 6, polyamide 11, polyamide 12, polyamide 612, etc.), aromatic polyamide (aramid), polyvinylidene fluoride, polypropylene, polyether ether ketone, polytetrafluoroethylene, polyethylene, wool, cotton, metal, etc., may be used either alone or in combination of two or more.

The resin 13 will be described later.

The first resin layer 20 is a resin layer provided on one principal surface on the outer surface side of the reinforcing fibrous substrate layer 10, and is composed of the resin 23. The first resin layer 20 constitutes an outer circumferential surface 21, and, when the shoe press belt 1 is being used, the wet paper web is carried and transferred via the felt on the outer circumferential surface 21.

The second resin layer 30 is a resin layer provided on the other principal surface on the inner surface side of the reinforcing fibrous substrate layer 10, and is composed of the resin 33. The second resin layer 30 constitutes the inner circumferential surface 31, and, when the shoe press belt 1 is being used, the inner circumferential surface 31 is disposed such that it comes into contact with the shoe of the shoe press mechanism (not illustrated).

Here, the resin 13 in the reinforcing fibrous substrate layer 10, the resin 23 which constitutes the first resin layer 20 and the resin 33 which constitutes the second resin layer 30 of the shoe press belt 1 will be explained.

In addition, in the present embodiment, at least one resin layer of the reinforcing fibrous substrate layer 10, the first resin layer 20 and the second resin layer 30 of the shoe press belt 1 comprises a polyurethane resin X. The polyurethane resin X can be obtainable by reacting a urethane prepolymer Y having an isocyanate group with a curing agent having an active hydrogen group, and the urethane prepolymer Y is obtainable by reacting a polyisocyanate compound comprising 2,4-tolylene-diisocyanate and/or 2,6-tolylene-diisocyanate with a polyol compound comprising one or more polyether polycarbonate diol(s).

Because the resin 13, resin 23 and resin 33 can have similar configurations, the resin 23 of the first resin layer 20 will be described in detail as a representative hereinbelow. Moreover, in the description below, cases in which the resin 23 comprises polyurethane resin X will principally be described.

The polyurethane resin X that constitutes the resin 23 uses as a urethane prepolymer the urethane prepolymer Y that is obtainable by reacting a polyisocyanate compound comprising 2,4-tolylene-diisocyanate and/or 2,6-tolylene-diisocyanate with a polyol compound comprising one or more polyether polycarbonate diol(s). This suppresses the unevenness in strength in the first resin layer 20 composed of the resin 23 and at the same time improves the strength of the first resin layer 20, and, as a result, suppresses the unevenness in strength among parts of the shoe press belt 1 and improves the strength of the shoe press belt 1.

For a detailed explanation, a polyurethane layer comprising a polycarbonate diol as a component of a urethane prepolymer has an excellent strength. On the other hand, the present inventors found that, when a polycarbonate diol is used as a component of a urethane prepolymer, there is unevenness in strength among parts of the obtained shoe press belt. The presence of uneven strength among parts of the shoe press belt may cause the shoe press belt to be damaged or degraded starting from a part where the strength is low. As a result, it becomes difficult to increase the durability of the shoe press belt.

The present inventors have made an intensive research to find out its causes, and found that, in general, when a urethane prepolymer is prepared using a polycarbonate diol, the viscosities of the urethane prepolymer and of a urethane composition in which a curing agent and the urethane prepolymer have been mixed are greatly increased, and thus the urethane composition cannot be uniformly discharged and applied at the time of producing a shoe press belt. In this case, it is difficult to form a uniform polyurethane layer.

On the other hand, the present inventors found that, when the polyether polycarbonate diol is used, a further improvement in strength of the polyurethane layer will be expected as compared to a case using a polycarbonate diol. On the other hand, the present inventors have encountered a problem that the viscosity of the urethane prepolymer obtainable by using polyether polycarbonate dial as well as that of the urethane composition using the same are greatly increased in a similar manner.

In order to solve this problem, the present inventors have made further investigation and found that, when a polyether polycarbonate polyol is used together with a polyisocyanate compound comprising 2,4-tolylene-diisocyanate and/or 2,6-tolylene-diisocyanate, the increase in the viscosity of the resulting urethane composition is suppressed and therefore it is possible to form a uniform polyurethane resin layer. It was also found that, when forming a resin layer in such a manner, not only the unevenness in strength among parts of the shoe press belt is suppressed, but also the strength of the shoe press belt is increased as a whole.

Unless specifically mentioned, unevenness "among parts" herein refers to the unevenness among any parts of a resin layer that constitutes the shoe press belt, namely a resin layer formed with one material, in the surface direction. For instance, in the shoe press belt 1 according to the present embodiment, for each of the reinforcing fibrous substrate layer 10, the first resin layer 20 and the second resin layer 30, any parts of each resin layer in its surface direction can be compared. Moreover, the unevenness in strength among parts in each resin layer has a composite influence on the shoe press belt, constituting the unevenness in strength among parts in the shoe press belt itself.

In specific, the first resin layer 20 constitutes the outer circumferential surface 21 of the shoe press belt 1. In the shoe press belt 1, the outer circumferential surface 21 is a part that is prone to the abrasion of the shoe press belt 1 associated to the contact and friction with a felt, etc. during the use of the shoe press belt 1, and damages such as cracks due to the bending fatigue of the shoe press belt 1. Therefore, the durability of the shoe press belt 1 will be improved by including polyurethane resin X in the first resin layer 20, which constitutes the outer circumferential surface 21 of the shoe press belt 1.

Hereinbelow, each component that constitutes the polyurethane resin X will be explained. As mentioned above, the polyurethane resin X that constitutes the resin 23 is obtainable by reacting a urethane prepolymer Y having an isocyanate group with a curing agent having an active hydrogen group.

(i) Urethane Prepolymer Y

The urethane prepolymer Y is obtainable by reacting a polyisocyanate compound comprising 2,4-tolylene-diisocyanate and/or 2,6-tolylene-diisocyanate with a polyol compound comprising one or more polyether polycarbonate diol(s).

(i-1) Polyol Compounds

As mentioned above, the polyol compound that constitutes the urethane prepolymer Y comprises a polyether polycarbonate diol. As mentioned above, when the polyether polycarbonate diol is used as a polyol compound for the urethane prepolymer Y, the first resin layer 20 itself will have an excellent strength. On the other hand, when the polyether polycarbonate diol is used simply as a polyol compound which constitutes a urethane prepolymer, the viscosity of the urethane prepolymer Y and then that of the urethane composition for forming the polyurethane resin X will be increased, and the resulting resin layer will have an unevenness in strength. However, in the present embodiment, by using the polyether polycarbonate diol together with 2,4-tolylene-diisocyanate (2,4-TDI) and/or 2,6-tolylene-diisocyanate (2,6-TDI), the increase in viscosity of the urethane prepolymer Y and then that of the urethane composition for forming and then polyurethane resin X are suppressed. Accordingly, in the first resin layer 20 composed of the resin 23, the unevenness in strength is suppressed and at the same time the ability of the polyether polycarbonate polyol is fully exploited, which improves the strength of the first resin layer 20.

The polyether polycarbonate polyol is not particularly limited, though includes, for example, a polyether polycarbonate polyol which comprises as a component a polyether polycarbonate diol comprising one or more unit(s) A expressed by the following formula (1):

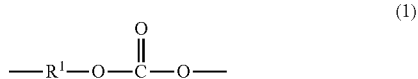

in the formula (1):

$R^1$ is a bivalent group derived from a polyether polyol.

In the aforementioned formula (1), $R^1$ is a bivalent group derived from a polyether polyol. For instance, $R^1$ can be a group expressed by the formula (2) below:

in the formula (2):

$R^2$ is, for each occurrence, identical or different, and is a straight-chain, branched or cyclic alkylene group having 1 or more and 20 or less carbon atom(s), and n is an integer equal to or more than 2 and equal to or less than 42.

Straight-chain alkylene groups of $R^2$ include, for example, methylene group, ethylene group, n-propylene group, n-butylene group, n-pentylene group, n-hexylene group, n-heptylene group, n-octylene group, n-nonylene group, n-decylene group, n-undecylene group, n-dodecylene group, n-tridecylene group, n-tetradecylene group, n-pentadecylene group, n-hexadecylene group, n-heptadecylene group, n-octadecylene group, n-nonadecylene group and n-icosylene group, etc. Branched alkylene groups of $R^2$ include, for example, 1-methylpropylene group, 2-methylpropylene group, 1,1-dimethylpropylene group, 1,2-dimethylpropylene group, 1,3-dimethylpropylene group, 2,2-dimethylpropylene group, 1,2,3-trimethylpropylene group, 1,1,2-trimethylpropylene group, 1,2,2-trimethylpropylene group, 1,1,3-trimethylpropylene group, 1-methylbutylene group, 2-methylbutylene group, 1,1-dimethylbutylene group, 1,2-dimethylbutylene group, 1,3-dimethylbutylene group, 1,4-dimethylbutylene group, 2,2-dimethylbutylene group, 2,3-dimethylbutylene group, 1,2,3-trimethylbutylene group, 1,2,4-trimethylbutylene group, 1,1,2-trimethylbutylene group, 1,2,2-trimethylbutylene group, 1,3,3-trimethylbutylene group, 1-methylpentylene group, 2-methylpentylene group, 3-methylpentylene group, 1-methylhexylene group, 2-methylhexylene group and 3-methylhexylene group, etc. A cyclic alkylene groups of $R^2$ can be, for example, a group that has a alicyclic group such as a cyclopentane ring, cyclohexane ring, cycloheptane ring or cyclooctane ring. In this case, the cyclic alkylene group is bound to an adjacent oxygen atom directly from the alicyclic group or via an alkylene group having 1 to 3 carbon atoms which is substituted for the alicyclic group. Such cyclic alkylene groups include, for example, 1,4-cyclohexanediylbismethylene group.

The number of carbon atoms of $R^2$ is, equal to or more than 1 and equal to or less than 20 as mentioned above, preferably equal to or more than 1 and equal to or less than 15, and more preferably, equal to or more than 2 and equal to or less than 8.

$R^2$ is, preferably, a straight-chain alkylene group having 1 or more and 15 or less carbon atoms, more preferably, a straight-chain alkylene group having 1 or more and 8 or less carbon atoms, further preferably, one selected from the group consisting of an ethylene group, n-propylene group, n-butylene group and n-hexylene group. By this, the viscosity of the resulting urethane composition and the unevenness among parts of the shoe press belt 1 can further be suppressed, and at the same time, the strength of the shoe press belt 1 will further be improved.

n may be an integer equal to or more than 2 and equal to or less than 42, preferably, 3 or more and 14 or less.

The number average formula weight of $R^1$ described above is not particularly limited, and it can be for example, equal to or more than 100 and equal to or less than 5,000. The number average formula weight of $R^1$ is preferably equal to or more than 200 and equal to or less than 3,000, more preferably equal to or more than 200 and equal to or less than 2,000. Provided that $R^1$ is thus derived from a polyether polyol of an adequate number average molecular weight, when using polyether polycarbonate diol, the viscosity increase of the resulting urethane composition will be appropriately suppressed, and it is possible to form a first resin layer 20 with more uniform polyurethane.

The aforementioned polycarbonate diol is, for example, expressed by the following formula (3):

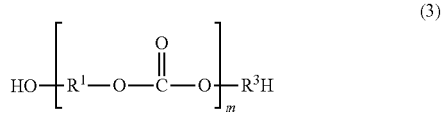

In the formula (3), $R^1$ and $R^3$ are each independently a bivalent group derived from a polyether polyol, and m is an integer equal to or more than 1 and equal to or less than 34.

Since $R^1$ is similar to $R^1$ in the aforementioned formula (1), $R^3$ can be a similar group as $R^1$, repeated detailed description shall be omitted. Moreover, $R^1$ and $R^3$ may be different or identical. However, in view of a method for producing a polyether polycarbonate diol, $R^3$ is usually identical to $R^1$.

When the polyether polycarbonate diol comprises more than one type of polyether polyol compound, their arrangement is not particularly limited. That is, the polyether polycarbonate diol may be a random copolymer, alternating copolymer or block copolymer.

The number average molecular weight of the polyether polycarbonate diol is not particularly limited, though, it can be, for example, equal to or more than 250 and equal to or less than 4000, preferably, equal to or more than 500 and equal to or less than 3000. The number average molecular weight of the polyether polycarbonate diol can be calculated, for example, by measuring the hydroxyl value.

Specifically, first, the hydroxyl value of the polyether polycarbonate diol is measured. The hydroxyl value of the polyether polycarbonate diol can be measured in conformity to JIS K 1557-1:2007. On the other hand, the hydroxyl value of the polyether polycarbonate diol (mgKOH/g) can also be expressed as in the following formula I:

(The hydroxyl value of the polyether polycarbonate diol(mgKOH/g))=56110/(The number average molecular weight of the polyether polycarbonate diol)×(The average number of hydroxyl groups per one molecule of the polyether polycarbonate diol)   (I)

Here, average number of hydroxyl groups per one molecule of the polyether polycarbonate diol is estimated to be 2.0. Therefore, the number average molecular weight of the polyether polycarbonate diol can be expressed as the following formula (II):

(The number average molecular weight of the polyether polycarbonate diol)=112,220/(The hydroxyl value of the polyether polycarbonate diol(mgKOH/g))   (II)

In the formula (II) described above, the number average molecular weight of the polyether polycarbonate dial can be calculated by substituting the hydroxyl value of the polyether polycarbonate diol obtained by measuring the hydroxyl value.

More than one type of polyether polycarbonate diol can be used to constitute the urethane prepolymer Y.

The combined amount of the polyether polycarbonate diol is not particularly limited, though it is preferably equal to or higher than 10% by mass and equal to or less than 90% by mass, more preferably equal to or higher than 20% by mass and equal to or less than 80% by mass, based on the total resin weight of the part in which the polyether polycarbonate diol is used. By this the strength of the shoe press belt 1 can further be improved, and at the same time the unevenness in strength among parts of the shoe press belt 1 can further be suppressed. Note that the combined amount described above is a proportion based on the amount of the resin in the resin 23, excluding inorganic fillers described later.

The polyol compound comprises the polyether polycarbonate diol, though it may comprise other polyol compounds. Such polyol compounds include, though not being particularly limited, for example, long-chain polyols, specifically aliphatic polyol compounds, alicyclic polyol compounds, polyester polyols such as polycaprolactone polyols and polyethylene adipate, polyether polyols such as polyethylene glycol, polyoxypropylene glycol, polyhexamethylene ether glycol, and polytetramethylene ether glycol (PTMG), polycarbonate diols, trimethylol propane, polybutadiene polyols, perfluoropolyether polyols, silicon polyols such as silicon diol, etc., which may be used alone or in combination of two or more.

Polycarbonate polyols include, though not being particularly limited, for example, a polycarbonate polyol synthesized from a polyol that is a material for a polycarbonate polyol and a polycarbonate source. The polyol that is a material for a polycarbonate polyol includes, though not being particularly limited, for example, a straight- or branched chain alkylene glycol having 2 or more and 20 or less carbon atoms, a hydroxyl group-containing cyclic hydrocarbon having 3 or more and 20 or less carbon atoms, etc., which may be used alone or in combination of two or more. The straight-chain alkylene glycol described above includes, for example, ethylene glycol, propanediol, butanediol, pentanediol, hexanediol, heptanediol, octanediol, nonanediol, decanediol, undecanediol, dodecanediol, etc. The branched chain alkylene glycol described above includes, for example, 2-methyl-1,3-propanediol, 2,2-dimethyl-1,3-propanediol, 3-methyl-1,5-pentanediol, 2-methyl-1,8-octanediol, etc. The hydroxyl group-containing cyclic hydrocarbon described above includes, for example, hydroxyl group-containing alicyclic alkanes such as 1,3-cyclohexanediol, 1,4-cyclohexanediol and 1,4-cyclohexane dimethanol. The polycarbonate source is not particularly limited. When the polycarbonate source is synthesized into a polycarbonate polyol, it becomes a carbonyl group that binds a group derived from the polyol.

Aliphatic polyols include, though not being particularly limited, for example, alkylene glycol compounds including straight-chain alkylene glycols such as ethylene glycol, 1,2-propanediol, 1,3-propanediol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol and 1,20-icosanediol, and branched chain alkylene glycols such as 2-methyl-1,3-propanediol, neopentyl glycol, 2-butyl-2-ethyl-1,3-propanediol, 3-methyl-1,5-pentanediol, 2-ethyl-1,3-hexanediol and 2-methyl-1,8-octanediol, glycol ether compounds such as diethylene glycol, triethylene glycol, tetraethylene glycol, dipropylene glycol and tripropylene glycol, glycerin, ditrimethylol propane, trimethylol propane (TMP), pentaerythritol, and dihydroxymethyl propionate (DHPA), etc.

Alicyclic polyol compounds include, though not being particularly limited, for example, 1,4-cyclohexane dimethanol, hydrogenated bisphenol A, etc.

Among those mentioned above, the polyol compound preferably comprises one or more selected from the group consisting of aliphatic polyols and alicyclic polyol compounds in addition to polyether polycarbonate diol.

In particular, an aliphatic polyol will contribute to an improvement in the strength of the first resin layer 20 when being used with a polyether polycarbonate dial. The aliphatic polyol compound preferably comprises one or more selected from the group consisting of alkylene glycol compounds, alicyclic polyol compounds and glycol ether compounds, further preferably comprises one or more selected from the group consisting of ethylene glycol, 1,3-propanediol, 1,4-butanediol, 1,5-pentanediol, 1,6-hexanediol, 1,4-cyclohexane dimethanol and diethylene glycol.

When the urethane prepolymer Y comprises an aliphatic polyol compound and/or alicyclic polyol compound, the total amount of the aliphatic polyol compound and alicyclic polyol compound contained in the urethane prepolymer Y is, for example, equal to or more than 0.1% by mass and equal to or less than 20% by mass, preferably, equal to or more than 1% by mass and equal to or less than 10% relative to that of the polyether polycarbonate polyol. This will sufficiently provide the above-described effect of combined use with the aliphatic polyol compound and/or alicyclic polyol compound while preventing a lowering of the exertion of the property due to the decrease in polyether polycarbonate polyol content.

When the urethane prepolymer Y comprises a polyol compound other than the polyether polycarbonate diol described above, the proportion of the polyether polycarbonate diol in all polyol compounds in the urethane prepolymer Y is, for example, equal to or higher than 10% by mass, preferably equal to or higher than 50% by mass, further preferably equal to or higher than 60% by mass. In particular, by setting the proportion of the polyether polycarbonate diol to be equal to or higher than 50% by mass, the property of the polyether polycarbonate diol will sufficiently be exerted in the resulting first resin layer 20. Particularly, the polyol compound in the urethane prepolymer Y more preferably consists essentially of a polyether polycarbonate diol, further preferably consists of polyether polycarbonate diol.

(i-2) Polyisocyanate Compounds

As mentioned above, the polyisocyanate compound that constitutes the urethane prepolymer Y comprises 2,4-tolylene-diisocyanate (2,4-TDI) and/or 2,6-tolylene-diisocyanate (2,6-TDI). Hereinbelow, 2,4-tolylene-diisocyanate (2,4-TDI) and 2,6-tolylene-diisocyanate (2,6-TDI) are collectively referred to, simply, as "TDI".

The polyisocyanate compound that comprises TDI ensures that a polycondensation reaction will occur upon the mixing of the urethane prepolymer Y and the curing agent while suppressing a rapid viscosity increase, resulting in yielding a high resin strength for the resin 23 of the first resin layer 20. Note that the urethane prepolymer Y may comprise as a component at least one of 2,4-TDI and 2,6-TDI, though, usually, TDI is produced and sold as a mixture of 2,4-TDI and 2,6-TDI, and is available as such mixture.

The total amount of the unreacted 2,4-TDI and 2,6-TDI contained in the urethane prepolymer Y is not particularly limited, though it is, for example, equal to or less than 2.0% by mass, preferably equal to or less than 1.0% by mass in the urethane prepolymer Y. By this, unintended side reactions at the time of forming the first resin layer 20 is suppressed and the strength of the first resin layer 20 is improved, and at the same time the unevenness in strength in the first resin layer 20 is suppressed.

The amount of the unreacted 2,4-TDI and 2,6-TDI can be quantified by gas chromatography (GC) method. Specifically, first, 2,4-TDI and 2,6-TDI samples at a series of known concentrations are used to draw a calibration curve based on the confirmation of the retention time and the chart areas. Next, the urethane prepolymer Y is diluted as appropriate and subjected to GC under the same condition. The amount of 2,4-TDI and 2,6-TDI after dilution is calculated from the confirmation of the retention time and the chart areas. Furthermore, the amount of 2,4-TDI and 2,6-TDI in the prepolymer Y is calculated from the diluted concentrations.

In order to reduce the amount of the unreacted 2,4-TDI and 2,6-TDI in the urethane prepolymer Y, for example, the amount of the 2,4-TDI and 2,6-TDI used at the time of producing the urethane prepolymer Y is adjusted to be smaller. An alternative method includes the removal of unreacted monomers after the production of the urethane prepolymer Y.

Moreover, the polyisocyanate compound that constitutes the urethane prepolymer Y may comprise a polyisocyanate compound other than TDI. Such polyisocyanate compound is not particularly limited, though, for example, one or more polyisocyanate compound selected from an aromatic polyisocyanate and an aliphatic polyisocyanate can be used.

The aliphatic polyisocyanate includes, for example, 1,6-hexamethylene diisocyanate (HDI), 1,5-pentamethylene diisocyanate, dicyclohexylmethane 4,4'-diisocyanate (H12MDI), cyclohexane diisocyanate (CHDI), 1,3-bis(isocyanatemethyl)cyclohexane (1,3-H6XDI) and 1,4-bis(isocyanatemethyl)cyclohexane (1,4-H6XDI), etc.

The aromatic polyisocyanate includes, for example, 4,4'-methylenebis(phenylisocyanate) (MDI), p-phenylene-diisocyanate (PPDI), dimethylbiphenylene diisocyanate (TODI), naphthalene-1,5-diisocyanate (NDI), 4,4-dibenzyldiisocyanate (DBDI), 1-isocyanate-3-isocyanatemethyl-3,5,5-trimethylcyclohexane (IPDI), xylylene diisocyanate (XDI), tetramethylxylylene-diisocyanate (TMXDI), and polymethylene polyphenyl polyisocyanate (polymeric MDI), etc.

The polyisocyanate compound preferably comprises one or more selected from the group consisting of an aliphatic polyisocyanate, dimethylbiphenylene diisocyanate, and 4,4'-methylenebis(phenylisocyanate), more preferably one or more selected from the group consisting of 4,4'-methylenebis(phenylisocyanate), dimethylbiphenylene diisocyanate, dicyclohexylmethane 4,4'-diisocyanate, 1,3-bis(isocyanatemethyl)cyclohexane and 1,4-bis(isocyanatemethyl)cyclohexane.

These compounds contribute to further improvement in strength of the first resin layer 20. In particular, the aliphatic polyisocyanate and dimethylbiphenylene diisocyanate contribute to the suppression of the increase in viscosity of the urethane prepolymer Y.

When the urethane prepolymer Y comprises a polyisocyanate compound other than TDI described above, the proportion of TDI (the total 2,4-TDI and 2,6-TDI content) in all polyisocyanate compounds in the urethane prepolymer Y is, for example, equal to or higher than 10% by mass, preferably equal to or higher than 50% by mass, further preferably equal to or more than 60% by mass. In particular, when the proportion of TDI is equal to or higher than 50% by mass, the property of TDI will sufficiently be exerted in the resulting first resin layer 20.

The urethane prepolymer Y described above may comprise an aliphatic polyol and/or an aliphatic polyisocyanate as (a) component(s). Such aliphatic compound contributes to the reduction of unreacted TDI monomers, which results in a sufficient improvement in strength in the first resin layer 20 and a suppression of the unevenness in strength in the first resin layer 20.

Such aliphatic polyol is used, for example, as a polyol compound. In order to sufficiently yield the above-described effect, the aliphatic polyol preferably comprises a straight-chain alkylene glycol, more preferably ethylene glycol, 1,3-propanediol, 1,4-butanediol, 1,5-pentanediol, and/or 1,6-hexane diol.

The aliphatic isocyanate describe above is used as the isocyanate compound described above. In order to sufficiently provide the effect described above, the aliphatic isocyanate preferably comprises dicyclohexylmethane 4,4'-diisocyanate, 1,3-bis(isocyanatemethyl)cyclohexane and/or 1,4-bis(isocyanatemethyl)cyclohexane, more preferably 1,3-bis(isocyanatemethyl)cyclohexane and/or 1,4-bis(isocyanatemethyl)cyclohexane.

The NCO content of the urethane prepolymer Y described above is not particularly limited, though it can be, for example, equal to or higher than 3.0% and equal to or less than 15%, preferably, equal to or higher than 4.0% and equal to or less than 12%. The NCO content of the urethane prepolymer can be the isocyanate group content of the urethane prepolymer measured in conformity to Method A described in K 1603-1:2007.

(ii) Curing Agents

The curing agent having an active hydrogen group is not particularly limited, and a curing agent comprising one or more compound(s) selected from a group consisting of polyol compounds and polyamines can be used.

As polyol compounds that can be contained in the curing agent, various aromatic polyol compounds can be used in addition to the aforementioned aliphatic polyol compound, alicyclic polyol compound and long-chain polyol compound.

Aromatic polyol compounds include, though not being particularly limited, for example, hydroquinonebis-β-hydroxyethyl ether (HQEE), hydroxyphenylether resorcinol (HER), 1,3-bis(2-hydroxyethoxybenzene), 1,4-bis(2-hydroxyethoxybenzene), bisphenol A, an alkylene oxide adduct of bisphenol A, bisphenol S, an alkylene oxide adduct of bisphenol S, etc.

Polyamines include, though not being particularly limited, hydrazine, ethylene diamine, 4,4'-methylene-bis-(2-chloroaniline) (MOCA), dimethylthiotoluene diamine (DMTDA), diethylthiotoluene diamine, diethyltoluene diamine (DETDA), trimethylene glycol di(p-aminobenzoate)(TMAB), 4,4'-methylene-bis-(3-chloro-2,6-diethylaniline) (MCDEA), 4,4'-methylene-bis-(2,6-diethylaniline) (MDEA), triisopropanol amine (TIPA), p-bis(aminocyclohexyl)methane (PACM), naphthalene-1,5-diamine, xylylene diamine, phenylene diamine, toluene-2,4-diamine, t-butyl toluene diamine, 1,2-bis(2-aminophenylthioethane).

Among those mentioned above, in order to further improve the strength of the resulting resin 23 and at the same time to further suppress the unevenness in strength among parts of the shoe press belt 1, the curing agent comprises preferably one or more selected from the group consisting of polyamine, aliphatic polyol compound and aromatic polyol compound, more preferably one or more selected from the group consisting of 4,4'-methylene-bis-(2-chloroaniline) (MOCA), dimethylthiotoluene diamine (DMTDA), diethyltoluene diamine (DETDA), 4,4'-methylene-bis-(3-chloro-2,6-diethylaniline) (MCDEA), hydroquinonebis-β-hydroxyethyl ether (HQEE) and 1,4-butanediol.

In particular, the curing agent preferably comprises a polyamine, more preferably one or more selected from the group consisting of 4,4'-methylene-bis-(2-chloroaniline) (MOCA), dimethylthiotoluene diamine (DMTDA), diethyltoluene diamine (DETDA), and 4,4'-methylene-bis-(3-chloro-2,6-diethylaniline) (MCDEA).

(iii) Inorganic Fillers

Apart from the aforementioned components, the resin 23 may comprise an inorganic filler such as titanium oxide, kaoline, clay, talc, diatomaceous earth, calcium carbonate, calcium silicate, magnesium silicate, silica and mica, either alone or in combination of two or more.

The hardness of the first resin layer 20 formed with the aforementioned polyurethane resin as measured in conformity to JIS K 6301:1995 using a spring-type hardness-testing machine type-A is not particularly limited, though it is, for example, at 22° C., equal to or higher than 90 HS JISA and equal to or less than 98 HS JISA, preferably, equal to or higher than 91 HS JISA and equal to or less than 97 HS JISA. Thus, the durability of the first resin layer 20 can sufficiently be increased.

When either of the resin 33 of the second resin layer 30 or the resin 13 of the reinforcing fibrous substrate layer 10 comprises the polyurethane resin X, the first resin layer 20 does not have to comprise the polyurethane resin X. In this case, as the materials for the resin 23 of the first resin layer 20, a thermosetting resin such as polyurethane resins (which do not comprise the polyurethane resin X), an epoxy resin and acrylic resin, or a thermoplastic resin such as polyamide, polyacrylate and polyester can be used alone or in combination of two or more.

As the resin 33 which constitutes the second resin layer 30, the resin materials as mentioned above which can be used in the first resin layer 20 can be used alone or in combination of two or more. The resin 33 which constitutes the second resin layer 30 may be identical to or different from the resin 23 which constitutes the first resin layer 20 regarding its type and composition. In particular, as the resin 33 which constitutes the second resin layer 30, from a viewpoint of improving the durability of the second resin layer 30, and from a viewpoint of improving resin production efficiency, it is preferred to be identical to the resin 23 of the first resin layer 20.

The second resin layer 30 preferably comprise the polyurethane resin X. The second resin layer 30 constitutes the inner circumferential surface 31 of the shoe press belt 1. In the shoe press belt 1, the inner circumferential surface 31 is a part that is prone to the friction with the shoe during the use of the shoe press belt 1 and damages such as cracks due to the bending fatigue of the shoe press belt 1. Therefore, by including the polyurethane resin X in the second resin layer 30 which constitutes the inner circumferential surface 21 of the shoe press belt 1, the durability of the shoe press belt 1 will be improved.

As the resin 13 which constitutes the reinforcing fibrous substrate layer 10, the resin materials as mentioned above which can be used in the first resin layer 20 can be used alone or in combination of two or more. The resin 13 which constitutes the reinforcing fibrous substrate layer 10 may be identical to or different from the resin 23 which constitutes the first resin layer 20 regarding its type and composition. In particular, as the resin 13 which constitutes the reinforcing fibrous substrate layer 10, from a viewpoint of improving resin producing efficiency, it is preferred to be identical to the resin 23 of the first resin layer 20.

The reinforcing fibrous substrate layer 10 preferably comprises the polyurethane resin X. This will improve the durability of the shoe press belt 1.

The dimensions of the shoe press belt 1 as mentioned above is not particularly limited, and can appropriately be set according to its intended use.

For instance, the width of the shoe press belt 1 is not particularly limited, though it can be equal to or more than 700 mm and equal to or less than 13500 mm, preferably equal to or more than 2500 mm and equal to or less than 12500 mm.

Moreover, for instance, the length (circumference) of the shoe press belt 1 is not particularly limited, though it can be equal to or more than 150 cm and equal to or less than 1500 cm, preferably equal to or more than 200 cm and equal to or less than 1100 cm.

The thickness of the shoe press belt 1 is not particularly limited, though it can be, for example, equal to or more than 1.5 mm and equal to or less than 7.0 mm, preferably equal to or more than 2.0 mm and equal to or less than 6.0 mm.

The thickness of the shoe press belt 1 may be different at each different part, or it may be identical.

As above, in the shoe press belt 1 according to the present embodiment, at least one of the resin 13 of the reinforcing fibrous substrate layer 10, the resin 23 of the first resin layer 20 and the resin 33 of the second resin layer 30 comprises a polyurethane resin X. Accordingly, the shoe press belt 1 has suppressed unevenness in strength among parts, and is excellent in strength.

Figure 2:
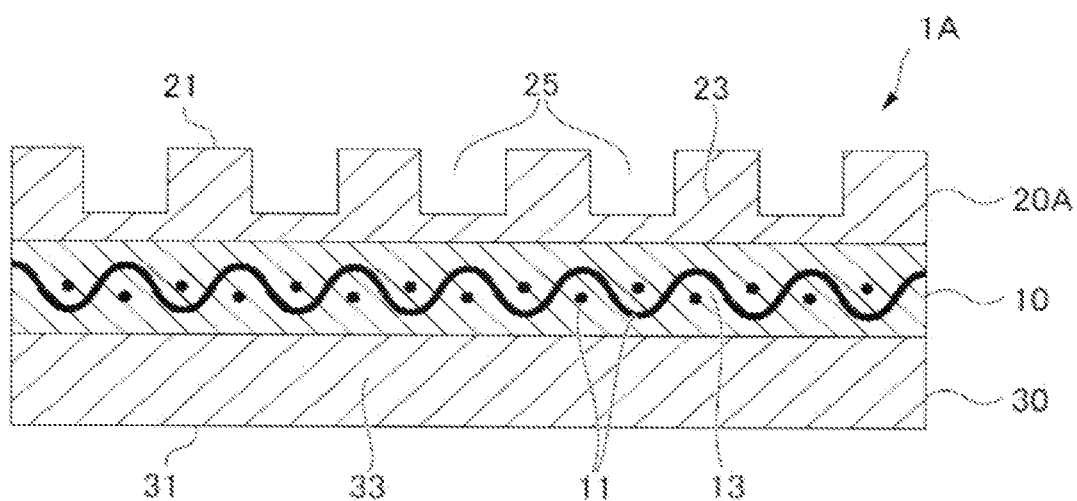
FIG. 2 is a cross-sectional view in a cross machine direction showing, a papermaking device according to another embodiment of the present invention.

Next, papermaking devicees according to other embodiments will be explained. FIG. 2 is a cross-sectional view in a cross machine direction showing a papermaking device according to another embodiment of the present invention. Hereinbelow, differences between the aforementioned embodiment will be mainly explained, and description of similar matters shall be omitted.

As shown in FIG. 2, in the shoe press belt 1A, which is a papermaking device, multiple drain grooves 25 have been formed on the outer circumferential surface 21 of the first resin layer 20A. When a shoe press belt 1A which has drain grooves 25 is used, more water can be removed from the wet paper web being carried by the shoe press belt 1A.

The configuration of the drain grooves 25 is not particularly limited, though, usually, in general, multiple continuous drain grooves are formed in parallel in the machine direction of the shoe press belt 1A. For instance, the groove width can be set to be equal to or more than 0.5 mm and equal to or less than 2.0 mm, the groove depth can be set to be equal to or more than 0.4 mm and equal to or less than 2.0 mm, the number of drain grooves can be set to be equal to or more than 5 and equal to or less than 20 drain grooves/inch. Moreover, the cross-sectional shape of the drain 25 may be set as appropriate, such as a rectangle, trapezoidal, U-shaped, or it may be set such that the parts where the land and groove bottom are met with the groove wall are rounded.

Moreover, the configurations of these drain grooves 25 may be the same for the groove width and depth, the number of drain grooves and the cross-sectional shape, or the drain grooves of different configurations may be combined. Furthermore, these drain grooves 25 may be formed as discontinuous bodies, or may be formed as multiple drain grooves which are arranged in parallel to the cross machine direction.

As above, in the shoe press belt 1A, too, at least any one of the resin 13 of the reinforcing fibrous substrate layer 10, the resin 23 of the first resin layer 20A and the resin 33 of the second resin layer 30 comprises the polyurethane resin X. Accordingly, the shoe press belt 1A has suppressed unevenness in strength among parts, and is excellent in strength.

In the description above, cases in which the papermaking device is a shoe press belt has been explained as one example of the present invention, though the present invention is not limited thereto, and it may be any papermaking device having a resin layer. For instance, a papermaking device according to the present invention can be a papermaking belt such as a wet paper web transfer belt for carrying out the transfer and delivery of a wet paper web (transfer belt), or a papermaking roll such as a press roll used in a roll press mechanism.

A papermaking belt such as a wet paper web transfer belt is also usually provided with a resin layer. Therefore, for the resin layer of the papermaking belt, the aforementioned polyurethane resin X can be used to produce a papermaking belt having a resin layer in which the unevenness in strength between its parts is suppressed, and which has an excellent strength. In particular, a papermaking belt is different from a papermaking roll, etc., in that its resin layer is not carried by any other member. Accordingly, it is extremely important to suppress the unevenness in strength among parts in the papermaking belt.

Moreover, in a papermaking roll such as a press roll, too, its circumference side surfaces may be composed of a resin layer. In this case, for the resin layer of a papermaking roll, a polyurethane resin X can be used to produce a papermaking roll having a resin layer in which the unevenness in strength between its parts is suppressed, and which has an excellent strength.

<2. Method for Producing Papermaking Device>

Figure 3:
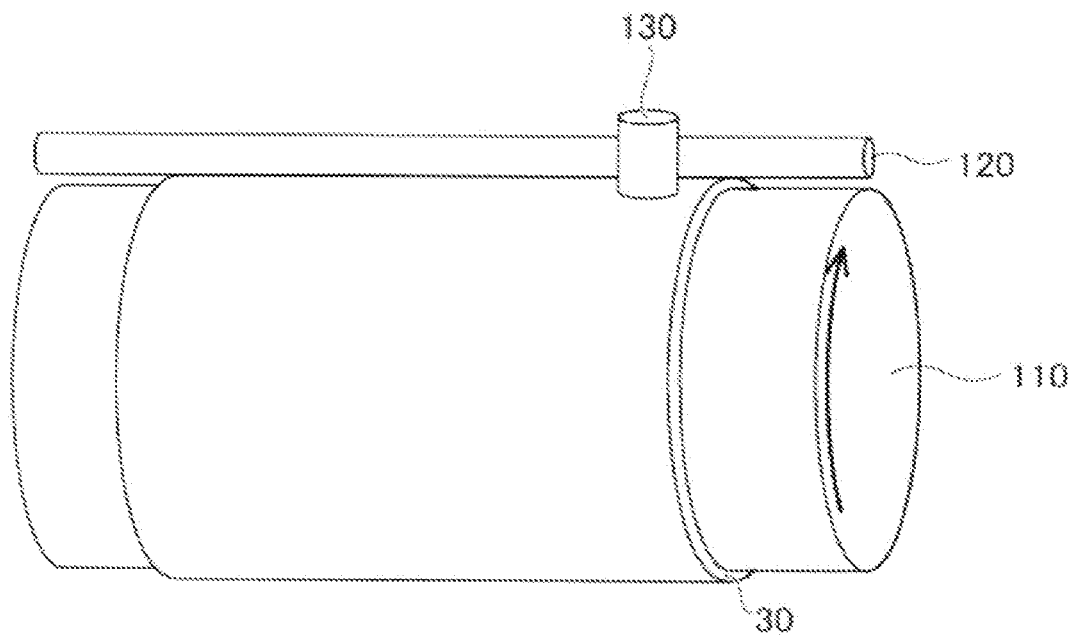
FIG. 3 is a schematic drawing for illustrating a preferred embodiment of a method for producing a papermaking device according to the present invention.
Figure 4:
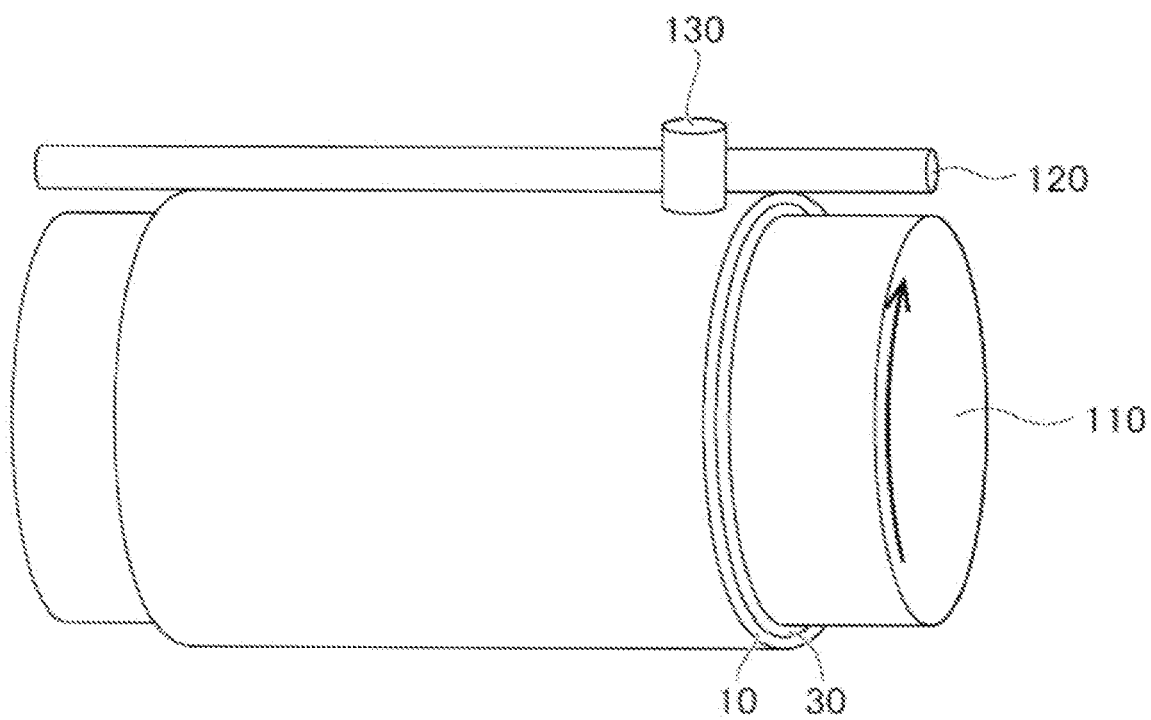
FIG. 4 is a schematic drawing for illustrating a preferred embodiment of a method for producing a papermaking device according to the present invention.
Figure 5:
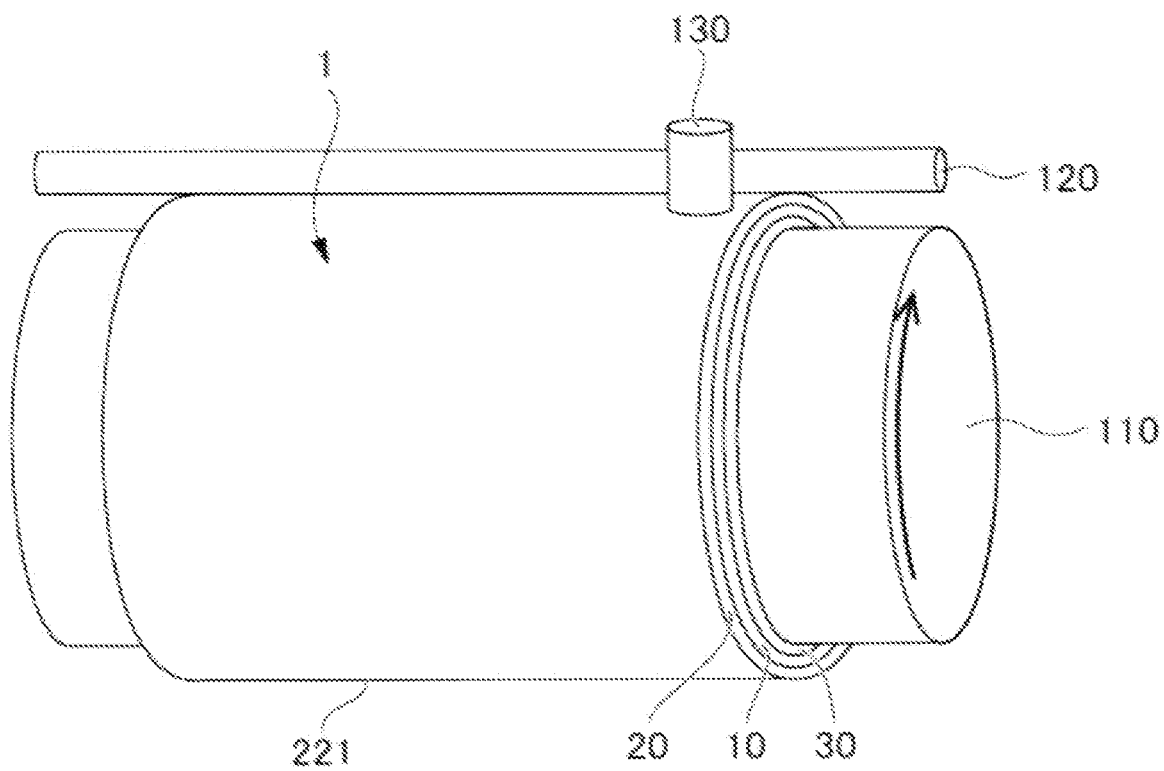
FIG. 5 is a schematic drawing for illustrating a preferred embodiment of a method for producing a papermaking device according to the present invention.

Next, preferred embodiments of the method for producing the papermaking device of the present invention will be described. FIGS. 3 to 5 are schematic drawings illustrating preferred embodiments of the method for producing the papermaking device.

A method for producing a papermaking device according to the present invention is a method for producing a papermaking device for use in a papermaking machine, comprising a step of forming a resin layer comprising a polyurethane resin by curing a polyurethane material, wherein:

the polyurethane material comprises a urethane prepolymer having an isocyanate group and a curing agent having an active hydrogen group, wherein the urethane prepolymer is obtainable by reacting a polyisocyanate compound comprising 2,4-tolylene-diisocyanate and/or 2,6-tolylene-diisocyanate with a polyol compound comprising one or more polyether polycarbonate diol(s).

Note that, in the present embodiment, a method for producing a shoe press belt will be explained as one example of papermaking device, though it goes without saying that the method for producing the papermaking device according to the present invention is not limited to the method for producing a shoe press belt. Moreover, in the present embodiment, the method for producing a shoe press belt as a papermaking device comprises a resin layer-forming step in which a first resin layer 20, a reinforcing fibrous substrate layer 10, and a second resin layer 30 are formed.

In the resin layer-forming step, the resin layer is to be formed. In this step, specifically, a laminated body is formed comprising a reinforcing fibrous substrate layer 10 in which an annular and band-shaped reinforcing fibrous substrate 11 is embedded in a resin 13, and a first resin layer 20 and a second resin layer 30 which are laminated on both sides of the reinforcing fibrous substrate layer 10.

The formation of such laminated body can be made by any method, though, in the present embodiment, a second resin layer 30 is formed. Then, on one surface of the second resin layer 30 a reinforcing fibrous substrate 11 is deposited, and to the reinforcing fibrous substrate 11 a resin material is applied, allowed to be impregnated and penetrate into it, to form a laminated body in which the reinforcing fibrous substrate layer 10 and the second resin layer 30 are integrated. Then, on a surface of the reinforcing fibrous substrate layer 10 that is oriented opposite to the bonding plane of the reinforcing fibrous substrate layer 10 with the second resin layer 30, a first resin layer 20 is formed.

Specifically, for instance, first, as shown in FIG. 3, a resin material is applied to the surface of the mandrel 110 on which a release agent has been applied, while rotating the mandrel 110, such that the thickness of the resin will be from 0.8 to 3.5 mm. This forms a resin precursor layer that is to be the second resin layer 30. Then, the temperature of the resin precursor layer is risen to between 40 and 140° C., pre-cured it for 0.5 to 1 hour to form the second resin layer 30.

Then, the reinforcing fibrous substrate 11 is disposed onto the pre-cured second resin layer 30 (not illustrated), and, as shown in FIG. 4, while rotating the mandrel 110, a resin material which will form the reinforcing fibrous substrate layer 10 is applied in 0.5 to 2.0 mm, allowed to be impregnated and penetrate the into the reinforcing fibrous substrate, and at the same time it is bonded to the second resin layer 30 to form a laminated body in which the reinforcing fibrous substrate layer 10 and the second resin layer 30 are integrated.

Thereafter, as shown in FIG. 5, while rotating the mandrel 110, a resin material which will form the first resin layer 20 is applied onto the surface of the reinforcing fibrous substrate layer 10 described above which is allowed to be impregnated with the resin material such that a resin precursor layer of thickness of 1.5 to 4 mm will be formed, which is to be the second resin layer 30. Then, the resin precursor layer is heated and cured at 70 to 140° C. for 2 to 20 hours to form a laminated body in which the first resin layer 20, the reinforcing fibrous substrate layer 10, and the second resin layer 30 are laminated.

Besides, the application of the resin material may be done by any method, though, in the present embodiment, this is done by discharging the resin material from the injection molding nozzle 130, while rotating the mandrel 110, and at the same time uniformly applying the provided resin material using a coater bar 120.

Here, at least any one of the resin 13 of the reinforcing fibrous substrate layer 10, the resin 23 of the first resin layer 20, and the resin 33 of the second resin layer 30 is formed with a polyurethane material which comprises a urethane prepolymer Y having an isocyanate group and a curing agent having an active hydrogen group. The urethane prepolymer Y is obtainable by reacting a polyisocyanate compound comprising 2,4-tolylene-diisocyanate and/or 2,6-tolylene-diisocyanate with a polyol compound comprising one or more polyether polycarbonate diol(s). This allows for suppressing an increase in viscosity of urethane composition (resin material). Accordingly, it is possible to form a uniform polyurethane resin layer.

Moreover, by using a polyurethane material of such composition, an appropriate viscosity for coating can be achieved at relatively low temperature. Furthermore, the polyurethane material of such composition shows a relatively low curing rate at the coating temperature. Thus, the generation of coating unevenness associated with an unintended curing upon coating can be prevented. The relatively low curing rate increases the time after producing the polyurethane material to its curing, which makes the handling of the polyurethane material easy.

Moreover, heating method is not particularly limited, though, for example, methods using far-infrared heater, etc. may be used.

The obtained laminated body goes through polishing or buff processing or as appropriate for the outer circumferential surface 21 and the inner circumferential surface 31, the ends of width direction are cut as appropriate and cleaned up, to provide the shoe press belt 1. The shoe press belt 1 is produced as above.

Moreover, when the shoe press belt 1A is to be produced, for a laminated body formed in the aforementioned resin layer-forming step, the drain grooves 25 may be formed on the outer circumferential surface 21 as follows.

The formation of such drain grooves 25 can be done by any method, though, for example, the drain grooves 25 may be formed by: polishing/buff-processing the outer surface of the laminated body obtained as above to achieve the desired thickness of the shoe press belt 1A (not illustrated), then, while rotating the mandrel 110, bringing a groove working device to which multiple disk-like rotary blades into contact with the outer circumferential surface 21.

The method for producing the shoe press belt in the above-described embodiment has been described as mandrel (one-roll) production method. However, as another embodiment, a two-roll production method as described below can also be employed. First, an annular reinforcing fibrous substrate 11 is hung over two rolls placed in parallel, and to this reinforcing fibrous substrate 11 a resin is applied, impregnated and laminated to form the second resin layer 30 together with the reinforcing fibrous substrate layer 10. Then, this is turned over, and the first resin layer 20 is formed on the surface of the inverted reinforcing fibrous substrate layer 10. This provides the shoe press belt 1. Besides, the order of formation of each resin layer may be optional.

In the description above, cases in which the papermaking device is a shoe press belt has been explained as one example of the present invention, though the present invention is not limited thereto, and it may relate to a method for producing any papermaking device having a resin layer. For instance, the present invention may be a method for producing a papermaking belt such as a wet paper web transfer belt (transfer belt), or it may be a method for producing a papermaking roll such as a press roll.

Even in the cases above, a papermaking belt or papermaking roll can be produced which has a suppressed unevenness in strength between parts and which has a resin layer with excellent strength by forming each resin layer using the above-described polyurethane material comprising as components the urethane prepolymer Y having an isocyanate group and a curing agent having an active hydrogen group.

As above, the present invention has been described in detail based on preferred embodiments, though the present invention is not limited thereto, and each component can be substituted with any one that is capable of performing an equal function, or an optional component can be added.

EXAMPLES

Hereinbelow, the present invention will more specifically be described with examples, though the present invention is not to be limited to these examples.

1. Production of Shoe Press Belt and Polyurethane Sheet Test Piece

Prior to producing a shoe press belt, first, the polyether polycarbonate diols and polycarbonate diols indicated in Table 1 as polyol compounds, and the resin materials of the compositions of Examples 1 to 7 and Comparative Examples 1 to 5 indicated in Tables 2 and 3 (urethane composition) obtained using said polyol compounds were prepared. Note that, for all resin materials, the urethane prepolymer and the curing agent were combined such that the combination ratio will be [H]/[NCO]=0.95.

Note that, for the urethane prepolymers of Examples 1 to 7 and Comparative Examples 1 to 3, unreacted isocyanate compound monomers were not removed, and used as they were. On the other hand, the urethane prepolymer of Comparative Examples 4 and 5, a urethane prepolymer was prepared in which unreacted isocyanate compound monomers had been removed, and this was used in the resin material.

In Table 1, "PEPCD1", "PEPCD2" and "PEPCD3" indicate polyether polycarbonate diols, "PCD1" and "PGD2" indicate polycarbonate diols, "PTMG250" indicates polytetramethylene glycol (the number average molecular weight 250), and "PTMG650" indicates polytetramethylene glycol (the number average molecular weight 650), respectively.

As for the number average molecular weight of the polyether polycarbonate diol in Table 1, for each polyether polycarbonate diol, its hydroxyl value was measured and the number average molecular weight was calculated based on the obtained hydroxyl value and according to the formula (II) described above. The same applies to the polycarbonate diol in Table 1 and the PTMGs in the aforementioned Table 3.

Moreover, in Tables 2 and 3, "TDI" indicates a mixture of 2,4-tolylene-diisocyanate and 2,6-tolylene-diisocyanate, "MDI" indicates 4,4'-methylenebis(phenylisocyanate), "H6XDI" indicates 1,4-bis(isocyanatemethyl)cyclohexane, "TODI" indicates dimethylbiphenylene diisocyanate, "PPDI" indicates p-phenylene-diisocyanate, "BD" indicates 1,4-butanediol, "DMTDA" indicates dimethylthiotoluene diamine, and "PTMG" indicates polytetramethylene glycol (the number average molecular weight: 1039, hydroxyl value: 108.0), respectively. In Tables 2 and 3, "%" described with the components indicates % by mass.

Next, shoe press belts were prepared according to the following method using the resin materials of Examples 1 to 7 and Comparative Examples 1 to 5.

To a surface of a mandrel having a diameter of 1500 mm and rotatable by any appropriate driving means, a resin material of either of Examples 1 to 7 or Comparative Examples 1 to 5 was applied to 1.4 mm thick while rotating the mandrel, using an injection molding nozzle that is capable of running parallel to the rotary shaft of the mandrel. This formed an uncured shoe-side resin layer (second resin layer). Then, the mandrel was left being rotated at a room temperature for 10 minutes, heated to 140° C. by a heating device attached to the mandrel, and pre-cured at 140° C. for 1 hour.

Next, a grid-like web material that consists of warp yarns interposed between weft yarns where the intersection of a weft yarn and a warp yarn was joined with urethane-type resin adhesive was placed in one layer on the outer circumferential surface of the shoe-side resin layer such that weft yarns are arranged along the shaft of the mandrel leaving no space. Here, the weft yarns of the grid-like web material are multifilament twist yarns of polyethylene terephthalate fiber of 5000 dtex, whereas the warp yarns are multifilament yarns of polyethylene terephthalate fiber of 550 dtex. The warp yarn density was set to 1 yarn/cm, whereas weft yarn density was set to 4 yarns/cm.

Next, a yarn wound layer was formed by spirally winding a multifilament yarns of polyethylene terephthalate fiber of 6700 dtex around the circumference of this grid-like web material with a pitch of 30 yarns/5 cm, and the grid-like web material and yarn wound layer together formed a reinforcing fibrous substrate. Then, the resin material same as that of the shoe-side resin layer (resin materials of Examples 1 to 7 and Comparative Examples 1 to 5) was applied so as to close gaps in the reinforcing fibrous substrate, forming a laminated body in which the reinforcing fibrous substrate layer and the shoe-side resin layer are integrated.

Next, over the reinforcing fibrous substrate layer, while rotating the mandrel, the resin material same as those of the reinforcing fibrous substrate layer and shoe-side resin layer (resin materials of Examples 1 to 7 and Comparative Examples 1 to 5) was applied to about 2.5 mm thick using an injection molding nozzle that is capable of running parallel to the rotating shaft of the mandrel to form an uncured felt-side resin layer (first resin layer).

Then, this was left at room temperature for 40 minutes while keeping the mandrel being rotated, further heated to 140° C. with heating equipment attached to the mandrel, and each resin layer was thermally cured at 140° C. for 4 hours. This formed a laminated body in which the felt-side resin layer, the reinforcing fibrous substrate layer, and the shoe-side resin layer are integrated.

Subsequently, the felt-contact surface of the felt-side resin layer was polished such that the total thickness would be 5.2 mm to give a laminated body.

After the steps above, shoe press belts according to Examples 1 to 7 and Comparative Examples 1 to 5 were obtained. An evaluation of hardness was performed for the obtained shoe press belts. Moreover, in order to evaluate the breaking strength and unevenness in tensile testing, test pieces of 1.0 mm thick polyurethane sheet were cut out from any 20 parts of the felt-side resin layer.

2. Evaluation 2.1 Fluidity of Prepolymer

For prepolymers used for resin materials of Examples 1 to 7 and Comparative Examples 1 to 5, the temperature at which the viscosity would reach 10 Pas that is appropriate for application. Specifically, the prepolymer used was gradually heated while measuring viscosity, and the temperature at which the viscosity reached 10 Pa·s was recorded. The viscosities of prepolymers were measured using a B-type viscometer (TOKI SANGYO Co, Ltd., Product name: TVB-10H). The rotor used was H3 rotor, and the measurement was performed at revolution speed of 5 rpm.

2.2 Curing Ability of Resin Material

For the resin materials of Examples 1 to 7 and Comparative Examples 1 to 5, the curing time was measured at a temperature at which the viscosity of the prepolymer reaches 10 Pa·s. The prepolymer and curing agent were warmed in advance to said temperature. Next, they were mixed and stirred, wherein the time point at which the stirring was started was set as the measurement starting point, and the time point at which the viscosity reached 100 Pa·s as the curing time. The rotor used was H6 rotor, and the measurement was performed at revolution speed of 5 rpm.

2.3 Measurement of Isocyanate Monomer in Prepolymer

For prepolymers used in the resin materials of Examples 1 to 7 and Comparative Examples 1 to 5, the amount of remaining isocyanate compound monomers, TDI monomers in particular, was measured by the aforementioned gas chromatography method.

2.4 Evaluation of Hardness

Hardness was measured for the outer circumferential surfaces of the shoe press belts according to Examples 1 to 7 and Comparative Examples 1 to 5. Specifically, the surface hardness of the felt-side resin layers at 22° C. was measured in conformity to JIS K 6301:1995 and using an A-type, spring-type hardness tester.

2.5 Evaluation of Breaking Strength in Tensile Testing

The breaking strength was measured using a universal tensile testing machine as the testing machine and a test piece of dumbbell-No. 3-shape defined in JIS K 6251 for the sample shape, at tension rate of 500 mm/min, and evaluated as stress (MPa) at the time of breaking of the test piece. Twenty measurements were made for each Example/Comparative Example, and the average value was presented.

2.6 Evaluation of Unevenness in Breaking Strength

The unevenness in the breaking strength was evaluated by calculated standard deviations for 20 measurements of the breaking strength in the tensile testing.

Tables 2 and 3 show the results of the above evaluations along with the compositions of the resin materials of Examples 1 to 7 and Comparative Examples 1 to 5, etc.

TABLE 1

| Type of Polyol compound | Diol Constituents Diol 1 | Diol Constituents Diol 2 | Diol 1/ Diol 2 (mol)/ (mol) | Number Average Molecular Weight | Hydroxyl Value (mg KOH/g) |
|---|---|---|---|---|---|
| PEPCD1 | PTMG250 | — | 100/0 | 958 | 1117.2 |
| PEPCD2 | PTMG250 | — | 100/0 | 1938 | 57.9 |
| PEPCD3 | PTMG650 | — | 100/0 | 2011 | 55.8 |
| PCD1 | 1,6-hexanediol | — | 100/0 | 1002 | 112 |
| PCD2 | 1,6-hexanediol | — | 100/0 | 2074 | 54.1 |

TABLE 2

| | | | Example 1 | Example 2 | Example 3 | Example 4 | Example 5 | Example 6 | Example 7 |
|---|---|---|---|---|---|---|---|---|---|
| Resin material | Prepolymer | Type of isocyanate compound | TDI | TDI | TDI | TDI 66% MDI 34% | TDI 68% H6XDI 32% | TDI 68% TODI 32% | TDI 80% H6XDI 20% |
| | | Proportion of TDI in isocyanate compound (mass %) | 100 | 100 | 100 | 66 | 68 | 68 | 80 |
| | | Type of polyol compound | PEPCD1 | PEPCD2 97.09% BD 2.91% | PEPCD1 59.23% PEPCD2 39.49% BD 1.28% | PEPCD2 | PEPCD2 | PEPCD2 | PEPCD2 69.44% PEPCD3 29.76% BD 0.79% |
| | | NCO % | 5.0% | 4.4% | 4.8% | 5.4% | 5.8% | 5.0% | 5.3% |
| | | Remaining isocyanate compound monomers (mass %) | 0.95% | 0.80% | 0.91% | 5.30% | 5.53% | 4.58% | 3.62% |
| | | of which TDI monomer (mass %) | 0.95% | 0.81% | 0.91% | 0.78% | 0.64% | 0.82% | 0.73% |
| | Curing agent | | DMTDA | DMTDA | DMTDA | DMTDA | DMTDA | DMTDA | DMTDA |
| Evaluation | | Hardness (HS JIS A) | 92A | 92A | 92A | 93A | 93A | 93A | 92A |
| | | Prepolymer temperature t at 10 Pa·s time point (° C.) | 45 | 55 | 46 | 40 | 47 | 45 | 38 |
| | | Curing time of resin material at temperature t (min) | 12 | 8 | 12 | 6 | 10 | 11 | 11 |
| | Tensile breaking strength (MPa) testing | Mean Value | 52.4 | 60.3 | 55.1 | 55.7 | 59.2 | 42.5 | 41.8 |
| | | SD | 1.9 | 2.3 | 1.9 | 1.5 | 1.7 | 2.4 | 1.3 |

TABLE 3

| | | | Comparative Example 1 | Comparative Example 2 | Comparative Example 3 | Comparative Example 4 | Comparative Example 5 |
|---|---|---|---|---|---|---|---|
| Resin material | Prepolymer | Type of isocyanate compound | PPDI | PPDI | MDI | PPDI | TDI |
| | | Proportion of TDI in isocyanate compound (mass %) | 0 | 0 | 0 | 0 | 100 |
| | | Type of polyol compound | PEPCD2 | PEPCD1 | PCD1 | PCD2 | PTMG |
| | | NCO % | 5.7% | 5.4% | 9.1% | 3.5% | 6.1% |
| | | Remaining isocyanate compound monomers (mass %) | 4.57% | 1.24% | >1% | <1% | <1% |
| | | of which TDI monomer (mass %) | 0% | 0% | 0% | 0% | <1% |
| | Curing agent | | DMTDA | DMTDA | BD | BD | DMTDA |

TABLE 3-continued

| | | Comparative Example 1 | Comparative Example 2 | Comparative Example 3 | Comparative Example 4 | Comparative Example 5 |
|---|---|---|---|---|---|---|
| Evaluation | Hardness (HS JIS A) | — | 92A | 95A | 95A | 95A |
| | Prepolymer temperature t at 10 Pa·s time point (° C.) | ✗90 PPDI precipitation | ✗90 PPDI precipitation | 65 | 71 | 25 |
| | Curing time of resin material at temperature t (min) | <0.5 | <0.5 | <5 | <5 | 20 |
| | Tensile breaking strength (MPa) — Mean Value | Impossible to mold | 40.5 | 35.1 | 36.9 | 30.8 |
| | testing — SD | | 4.7 | 3.6 | 5.7 | 1.1 |

As shown in Tables 2 and 3, the shoe press belts according to Examples 1 to 7 had a suppressed unevenness in strength among their parts and further were better in strength. In comparison, the shoe press belts according to Comparative Examples 1 to 5 either had a greater unevenness in strength among their parts or was inferior in strength.

In particular, in Comparative Examples 3 and 4 in which polycarbonate diol were used as polyol compounds, there was a large unevenness in strength among parts. Because of this, the shoe press belt according to Comparative Examples 3 and 4 are likely to be broken starting from a part having a weak strength, failed to increase the durability of the shoe press belt. Moreover, in Comparative Examples 5, as a result of using polytetramethylene glycol as a polyol compound, the unevenness in strength among parts could be suppressed, though the shoe press belt had an inferior strength.

Furthermore, in Comparative Examples 1 and 2, although the polyether polycarbonate polyol was used, TDI was not used as the isocyanate compound. Because of this, it did not reach the temperature that is appropriate for application when the temperature of the prepolymer was not high, and the curing time of the resin material at that temperature was extremely short. As a result, in Comparative Examples 1, it was not possible to produce any shoe press belt. In Comparative Examples 2, too, there was a large unevenness in strength among parts.

Furthermore, in Examples 1 to 7, as compared to the cases of Comparative Examples 1 to 4, the temperatures at which the viscosity is appropriate for application was generally low, and the curing time of the resin material at that temperature was generally long. Accordingly, it was confirmed that the workability in producing a shoe press belt was improved by using the resin material described in Examples 1 to 7, shoe press belt.

What is claimed is:

1. A papermaking device configured for use in a papermaking machine, the device comprising:
   a resin layer comprising a polyurethane resin,
   wherein the polyurethane resin is obtained by reacting a urethane prepolymer comprising an isocyanate group with a curing agent comprising an active hydrogen group,
   wherein the urethane prepolymer is obtained by reacting a polyisocyanate compound comprising 2,4-tolylene-diisocyanate and/or 2,6-tolylene-diisocyanate with a polyol compound comprising a polyether polycarbonate diol, and
   wherein the polyether polycarbonate diol comprises a unit A of formula (1)

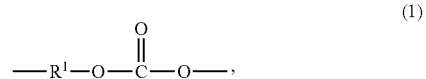

$R^1$ being a bivalent group derived from a polyether polyol, and
   wherein the polyether polycarbonate diol is used as a polyol compound together with the 2,4-tolylene-diisocyanate and/or 2,6-tolylene-diisocyanate for the urethane prepolymer to make the polyurethane resin.

2. The papermaking device of claim 1, wherein the 2,4-tolylene-diisocyanate and/or 2,6-tolylene-diisocyanate are present the polyisocyanate compound in a total amount of at least 50% by mass.

3. The papermaking device of claim 1, wherein the polyisocyanate compound further comprises 4,4'-methylenebis(phenylisocyanate), dimethylbiphenylene diisocyanate, 1,3-bis(isocyanatemethyl)cyclohexane, 1,4-bis(isocyanatemethyl)cyclohexane, or a mixture thereof.

4. The papermaking device of claim 1, wherein the polyether polycarbonate diol is present in the polyol compound in at least 50% by mass.

5. The papermaking device of claim 1, wherein the curing agent comprises a polyamine.

6. The papermaking device of claim 1, wherein the urethane prepolymer comprises an aliphatic polyol and/or aliphatic polyisocyanate.

7. The papermaking device of claim 6, wherein the aliphatic polyol is a component of the urethane prepolymer and comprises a straight-chain alkylene glycol.

8. The papermaking device of claim 6, wherein the aliphatic polyisocyanate is a component of the urethane prepolymer and comprises 1,3-bis(isocyanatemethyl)cyclohexane and/or 1,4-bis(isocyanatemethyl)cyclohexane.

9. The papermaking device of claim 1, wherein a total amount of unreacted 2,4-tolylene-diisocyanate and 2,6-tolylene-diisocyanate contained in the prepolymer is equal to or less than 1.0% by mass in the urethane prepolymer.

10. The papermaking device of claim 1, which is a shoe press belt.

11. The papermaking device of claim 10, comprising, as the resin layer, a first layer which constitutes the outer circumferential surface of the shoe press belt,
    wherein the first layer comprises the polyurethane resin.

12. The papermaking device of claim 10, comprising, as the resin layer, a second layer which constitutes the inner circumferential surface of the shoe press belt,
    wherein the second layer comprises the polyurethane resin.

13. A method for producing a papermaking device suitable for use in a papermaking machine, the method comprising:
   forming a resin layer comprising a polyurethane resin by curing a polyurethane material,
   wherein the polyurethane material comprises a urethane prepolymer having an isocyanate group and a curing agent having an active hydrogen group,
   wherein the urethane prepolymer is obtained by reacting a polyisocyanate compound comprising 2,4-tolylene-diisocyanate and/or 2,6-tolylene-diisocyanate with a polyol compound comprising a polyether polycarbonate diol, and
   wherein the polyether polycarbonate diol comprises a unit A of formula (1)

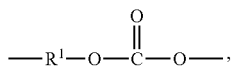

(1)

$R^1$ being a bivalent group derived from a polyether polyol, and
   wherein the polyether polycarbonate diol is used as a polyol compound together with the 2,4-tolylene-diisocyanate and/or 2,6-tolylene-diisocyanate for the urethane prepolymer to make the polyurethane resin.

14. The papermaking device of claim 1, wherein $R^1$ in the unit A of formula (1) has a number average formula weight in a range of from 200 to 3,000.

15. The papermaking device of claim 1, wherein the polyether polycarbonate diol is of formula (3):

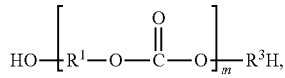

(3)

wherein
$R^1$ and $R^3$ are independently a bivalent group derived from a polyether polyol, and
m is an integer in a range of from 1 to 34.

16. The papermaking device of claim 1, wherein $R^1$ in the unit A of formula (1) is a group of formula (2):

(2)

wherein $R^2$ is independently an ethylene group, n-propylene group, n-butylene group, or n-hexylene group.

17. The papermaking device of claim 13, wherein $R^1$ in the unit A of formula (1) has a number average formula weight in a range of from 200 to 3,000.

18. The papermaking device of claim 13, wherein the polyether polycarbonate diol is of formula (3):

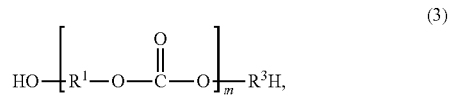

(3)

wherein
$R^1$ and $R^3$ are independently a bivalent group derived from a polyether polyol, and
m is an integer in a range of from 1 to 34.

19. The papermaking device of claim 13, wherein $R^1$ in the unit A of formula (1) is a group of formula (2):

(2)

wherein $R^2$ is independently an ethylene group, n-propylene group, n-butylene group, or n-hexylene group.

* * * * *